US009519626B2

(12) United States Patent
Zeine et al.

(10) Patent No.: US 9,519,626 B2
(45) Date of Patent: *Dec. 13, 2016

(54) HYPERLINK DESTINATION VISIBILITY (71) Applicant: Microsoft Technology Licensing, LLC, Redmond, WA (US)

(72) Inventors: Hatem Zeine, Redmond, WA (US); Meir Shmouely, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,136

(22) Filed: Feb. 11, 2015

(65) Prior Publication Data
US 2015/0154158 A1    Jun. 4, 2015

Related U.S. Application Data (62) Division of application No. 13/226,078, filed on Sep. 6, 2011, now Pat. No. 8,996,976.

(51) Int. Cl.
*G06F 17/22* (2006.01)
*G06F 17/30* (2006.01)
(Continued)

(52) U.S. Cl.
CPC ..... *G06F 17/2235* (2013.01); *G06F 17/30873* (2013.01); *G06F 17/30882* (2013.01);
(Continued)

(58) Field of Classification Search
CPC ............ G06F 17/30873; G06F 17/2235; G06F 17/30905; G06F 17/30882; H04L 67/10; H04L 67/42
See application file for complete search history.

(56) References Cited

U.S. PATENT DOCUMENTS 5,870,769 A * 2/1999 Freund .............. G06F 17/30899
707/E17.119
5,978,818 A    11/1999 Lin
(Continued)

FOREIGN PATENT DOCUMENTS

CN    1529862    9/2004
CN    102890709    1/2013
(Continued)

OTHER PUBLICATIONS

US 8,627,194, 01/2014, Zeine et al. (withdrawn)
(Continued)

*Primary Examiner* — Maikhanh Nguyen
(74) *Attorney, Agent, or Firm* — Steven J. Spellman; Tom Wong; Micky Minhas (57) ABSTRACT Various embodiments utilize page scripting and parsing to identify the target destination of a hyperlink and provide a visual indication of the destination to the user without causing redirection to the target destination. In some embodiments, hyperlink color, highlighting, or icons are used to indicate the destination. Particular colors and/or icons selected to indicate the destination can, in some embodiments, be selected based on the domain hosting the target destination. In at least some embodiments, the destination of a link is determined by the page script run by a web browser on a user's device, while in other embodiments, information is transmitted to a web request handler on the server hosting the web site to determine the destination.

20 Claims, 6 Drawing Sheets

(51) Int. Cl.
  *H04L 29/08* (2006.01)
  *H04L 29/06* (2006.01)
(52) U.S. Cl.
  CPC ........ *G06F 17/30905* (2013.01); *H04L 67/10* (2013.01); *H04L 67/42* (2013.01)

(56) References Cited

U.S. PATENT DOCUMENTS

| | | | |
|---|---|---|---|
| 6,023,701 A | 2/2000 | Malik et al. | |
| 6,052,486 A * | 4/2000 | Knowlton | G06F 17/30873 382/232 |
| 6,088,707 A | 7/2000 | Bates et al. | |
| 6,405,238 B1 * | 6/2002 | Votipka | G06F 17/30882 707/E17.013 |
| 6,585,776 B1 * | 7/2003 | Bates | G06F 3/04855 707/E17.013 |
| 6,601,066 B1 * | 7/2003 | Davis-Hall | G06F 17/3089 |
| 6,606,653 B1 * | 8/2003 | Ackermann, Jr. | H04L 29/12009 709/203 |
| 6,763,496 B1 * | 7/2004 | Hennings | G06F 17/30899 707/E17.119 |
| 6,782,423 B1 * | 8/2004 | Nakayama | G06F 17/30864 706/59 |
| 6,848,075 B1 | 1/2005 | Becker et al. | |
| 6,925,496 B1 | 8/2005 | Ingram et al. | |
| 7,155,489 B1 | 12/2006 | Heilbron et al. | |
| 7,206,839 B2 | 4/2007 | Ingram et al. | |
| 7,464,326 B2 | 12/2008 | Kawai et al. | |
| 7,707,518 B2 | 4/2010 | Veselova | |
| 7,761,785 B2 | 7/2010 | Veselova et al. | |
| 7,788,245 B1 * | 8/2010 | Eddings | G06F 17/30864 707/705 |
| 8,176,430 B1 | 5/2012 | Cahill | |
| 8,996,976 B2 | 3/2015 | Zeine et al. | |
| 2002/0019837 A1 | 2/2002 | Balnaves | |
| 2002/0032745 A1 | 3/2002 | Honda | |
| 2002/0107882 A1 | 8/2002 | Gorelick et al. | |
| 2005/0076097 A1 | 4/2005 | Sullivan et al. | |
| 2005/0149851 A1 * | 7/2005 | Mittal | G06F 17/2235 715/205 |
| 2005/0193090 A1 | 9/2005 | Ingram et al. | |
| 2007/0067333 A1 | 3/2007 | Cho et al. | |
| 2007/0079259 A1 | 4/2007 | Sauve et al. | |
| 2008/0114737 A1 | 5/2008 | Neely et al. | |
| 2008/0115048 A1 | 5/2008 | Veselova et al. | |
| 2008/0115069 A1 | 5/2008 | Veselova | |
| 2008/0172738 A1 | 7/2008 | Bates et al. | |
| 2008/0244460 A1 | 10/2008 | Louch | |
| 2008/0256608 A1 | 10/2008 | Gottlieb et al. | |
| 2009/0094327 A1 | 4/2009 | Shuster et al. | |
| 2009/0199135 A1 | 8/2009 | Arav | |
| 2009/0234730 A1 | 9/2009 | Lee | |
| 2010/0205547 A1 | 8/2010 | Boegelund et al. | |
| 2010/0274970 A1 * | 10/2010 | Treuhaft | H04L 29/12066 711/118 |
| 2011/0167328 A1 | 7/2011 | Iverson | |
| 2011/0209040 A1 | 8/2011 | Zeine et al. | |
| 2012/0030551 A1 | 2/2012 | Bank et al. | |

FOREIGN PATENT DOCUMENTS

| | | |
|---|---|---|
| JP | 2005085156 | 3/2005 |
| JP | 2011059803 | 3/2011 |

OTHER PUBLICATIONS

"Supplementary Search Report Issued in European Patent Application No. 12830535.6," Mailed Date: Nov. 23, 2015, 10 Pages.
Kingsley-Hughes et al., "Chapter 12. Dynamic HTML and JavaScript," In 11 JavaScript(TM) 1.5 by Example, Jan. 19, 2001, 4 pages.
Sowden, Paul, "Alternative Style: Working With Alternate Style Sheets," Retrieved from <<http://www.alistapart.com/articles/alternate/>>, Nov. 2, 2001, 4 pages.
"Corrected Notice of Allowance", U.S. Appl. No. 13/226,078, Nov. 4, 2013, 12 pages.
"Final Office Action", U.S. Appl. No. 13/226,078, Jul. 3, 2014, 14 pages.
"Foreign Office Action", CN Application No. 201210327555.8, Dec. 17, 2014, 16 pages.
"International Search Report and Written Opinion", Application No. PCT/US2012/050219, Feb. 19, 2013, 10 pages.
"Non-Final Office Action", U.S. Appl. No. 13/226,078, Mar. 15, 2013, 14 pages.
"Non-Final Office Action", U.S. Appl. No. 13/226,078, Mar. 7, 2014, 15 pages.
"Notice of Allowance", U.S. Appl. No. 13/226,078, Aug. 27, 2013, 15 pages.
"Notice of Allowance", U.S. Appl. No. 13/226,078, Nov. 13, 2014, 4 pages.
"Restriction Requirement", U.S. Appl. No. 13/226,078, Jan. 11, 2013, 6 pages.
Genest, et al.,' "Looking Ahead: A Comparison of Page Preview Techniques for Goal-Directed Web Navigation", IFIP International Federation for Information Processing, Aug. 24, 2009, pp. 378-397.
Kopetzky, et al.,' "Visual Preview for Link Traversal on the World Wide Web", Computer Networks: The International Journal of Computer and Telecommunications Networking, vol. 31 , Issue 11-16, May 1999, pp. 447-454.
Weinreich, et al.,' "Concepts for Improved Visualization of Web Link Attributes", Computer Networks: The International Journal of Computer and Telecommunications Networking, vol. 33 , Issue 1-6, Available at <http://www9.org/w9cdrom/319/319.html>,Jun. 2000, 16 pages.
Weinreich, et al.,' "The Look of the Link—Concepts for the User Interface of Extended Hyperlinks", Proceedings of the 9th international World Wide Web conference on Computer networks, Aug. 14, 2001, 10 pages.
Witt, et al.,' "Reducing Cognitive Overhead on the World Wide Web", Proceedings of the twenty-fifth Australasian conference on Computer science—vol. 4, Jan. 2002, 10 pages.
"Foreign Office Action", CN Application No. 201210327555.8, May 20, 2015, 11 pages.
"Third Office Action and Search Report Received for China Patent Application No. 201210327555.8," Mailed Date: Sep. 1, 2015, 14 Pages.
Japanese Office Action mailed Jun. 15, 2016 for Japanese Patent Application No. 2014-529725, a counterpart foreign application of U.S. Appl. No. 13/226,078, 8 pages.
Takahashi, "User kyuzo-chyu!!, Web browser no fuman o subete kaishou, Firefox kanzen nyumon, Tsukatte inai anata wa son o shiteiru, dai-11-kai", Network World, vol. 2, No. 11, Feb. 1, 2006, IDG Japan, Japan, pp. 154-156.

\* cited by examiner

HYPERLINK DESTINATION VISIBILITY

RELATED APPLICATION

This application is a divisional of and claims priority under 35 U.S.C. §120 to U.S. patent application Ser. No. 13/226,078, filed Sep. 6, 2011, entitled "Hyperlink Destination Visibility", the entire disclosure and content of which is incorporated by reference herein in its entirety.

BACKGROUND

Many web sites present aggregated content from various content sources to users. For example, a web page can include hyperlinks that can take the user to a different page on the web site or to a different web site altogether. In some instances, what appears to be a hyperlink leading to additional information on a topic instead takes a user to a search engine page listing search results for the topic. Often, users are given little to no indication about where a given link will take them, which can lead to frustration or wasted time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize page scripting and parsing to identify the destination of a hyperlink and provide a visual indication of the destination to the user. In some embodiments, hyperlink color, highlighting, or icons are used to indicate the destination. In at least some embodiments, the destination of a link is determined by the page script run by a web browser on a user's device, while in other embodiments, information is transmitted to a web request handler on the server hosting the web site to determine the destination.

BRIEF DESCRIPTION OF THE DRAWINGS

While the specification concludes with claims particularly pointing out and distinctly claiming the subject matter, it is believed that the embodiments will be better understood from the following description in conjunction with the accompanying figures, in which:

DETAILED DESCRIPTION

Overview

Various embodiments utilize page scripting and parsing to identify the target destination of a hyperlink and provide a visual indication of the destination to the user without causing redirection to the target destination. In some embodiments, hyperlink color, highlighting, or icons are used to indicate the destination. Particular colors and/or icons selected to indicate the destination can, in some embodiments, be selected based on the domain hosting the target destination. In at least some embodiments, the destination of a link is determined by the page script run by a web browser on a user's device, while in other embodiments, information is transmitted to a web request handler on the server hosting the web site to determine the destination.

In the discussion that follows, a section entitled "Example Operating Environment" describes an operating environment in accordance with one or more embodiments. Next, a section entitled "Example Embodiment" describes various embodiments of hyperlink destination visibility. In particular, the section describes processes for determining the destination of a hyperlink and indicating to a user the destination. Finally, a section entitled "Example System" is provided and describes an example system that can be used to implement one or more embodiments.

Consider, now, an example operating environment in accordance with one or more embodiments.

Example Operating Environment

Figure 1:
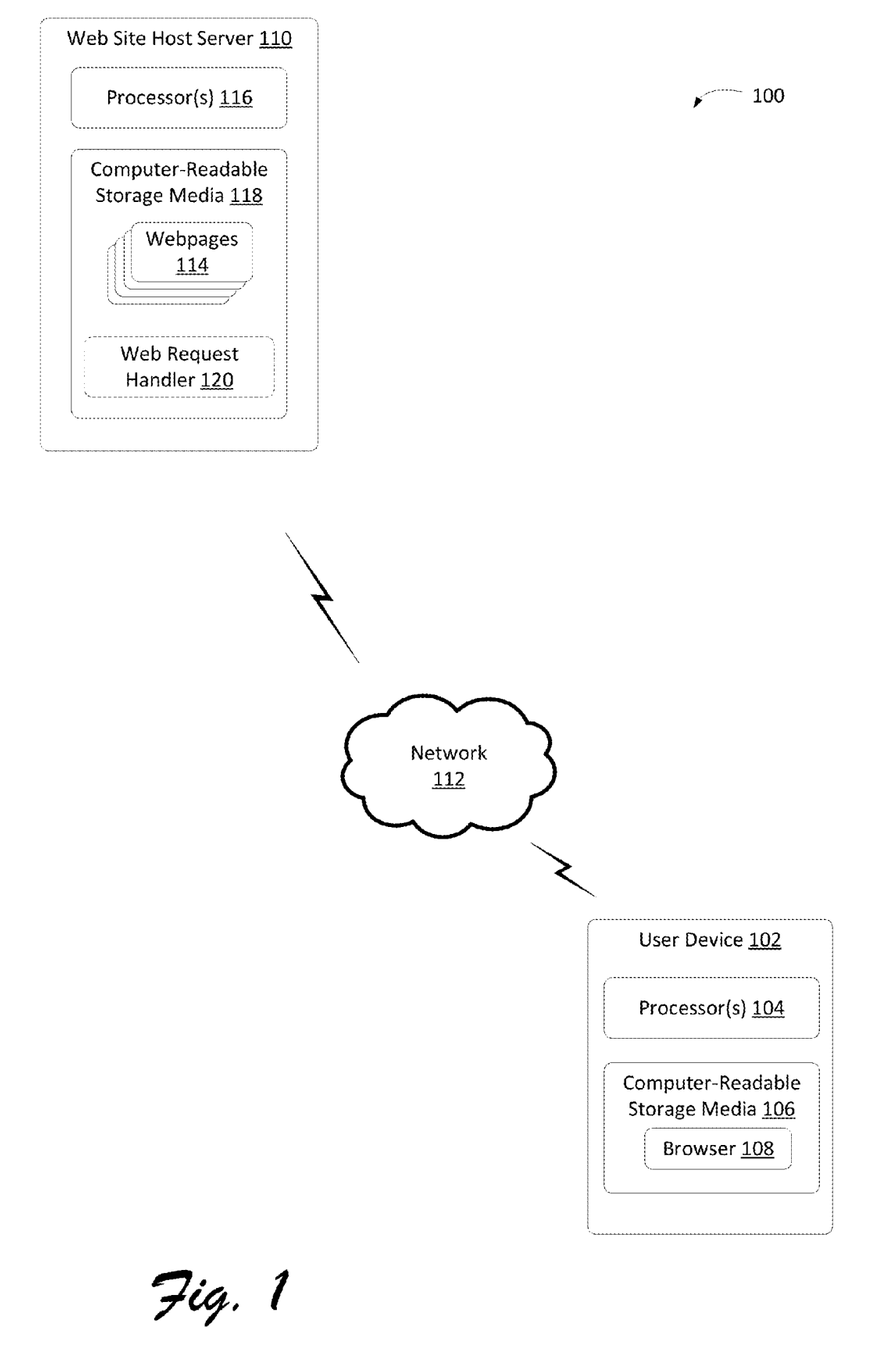
FIG. 1 is an illustration of an example environment in accordance with one or more embodiments.

FIG. 1 is an illustration of an example environment 100 in accordance with one or more embodiments. Environment 100 includes a user device 102 including one or more processors 104 and computer-readable storage media 106. User device 102 can be embodied as any suitable computing device such as, by way of example and not limitation, a desktop computer, a portable computer, a netbook, a handheld computer such as a personal digital assistant (PDA), cell phone, and the like.

Computer-readable storage media 106 includes one or more applications, which can include at least a software executable module in the form of a web browser 108. Web browser 108 can receive content from and send content to other servers, such as web site host server 110, via network 112, such as the Internet. Such content can include any suitable type of content that can be received from and sent to web sites hosted by the servers. In various embodiments, web browser 108 is configured to cause a webpage to be displayed to a user according to styles defined by information associated with the webpage. Styles can be specified using the Cascading Style Sheets (CSS) language or in other suitable ways. The information associated with the webpage can be included in page script, which includes instructions to the browser about how to cause the webpage to be displayed. For example, information associated with a certain webpage can define a style such that a hyperlink anchor (e.g., the location within a page from which the hyperlink can be followed) is underlined and displayed in blue while other text on the page is displayed in black. In various embodiments, the style can depend on information associated with the target of a hyperlink (e.g., the location to which the hyperlink leads).

In various embodiments, web site host server 110 hosts a plurality of webpages 114. Web site host server 110 also includes one or more processors 116 and computer-readable storage media 118 on which the webpages 114 reside. In some embodiments, a web request handler 120 also resides on computer-readable storage media 118. Web request handler 120 can be configured to determine the target of dynamic hyperlinks included in one or more webpages 114 and transmit information associated with the target to the browser 108 via network 112. The web request handler is described in further detail below.

The computer-readable storage media included in each device or server can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 6.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer-readable memory devices. The features of the user interface techniques described below are platform-independent, meaning that the techniques may be implemented on a variety of commercial computing platforms having a variety of processors.

Having described an example operating environment, consider now a discussion of various embodiments employing techniques to visually indicate the destination of a hyperlink to a user.

Example Embodiment

The discussion that follows starts first with a description of an example web browser and its associated user interface. Following this, a discussion of various embodiments of visually indicating the destination of a hyperlink is provided.

Figure 2:
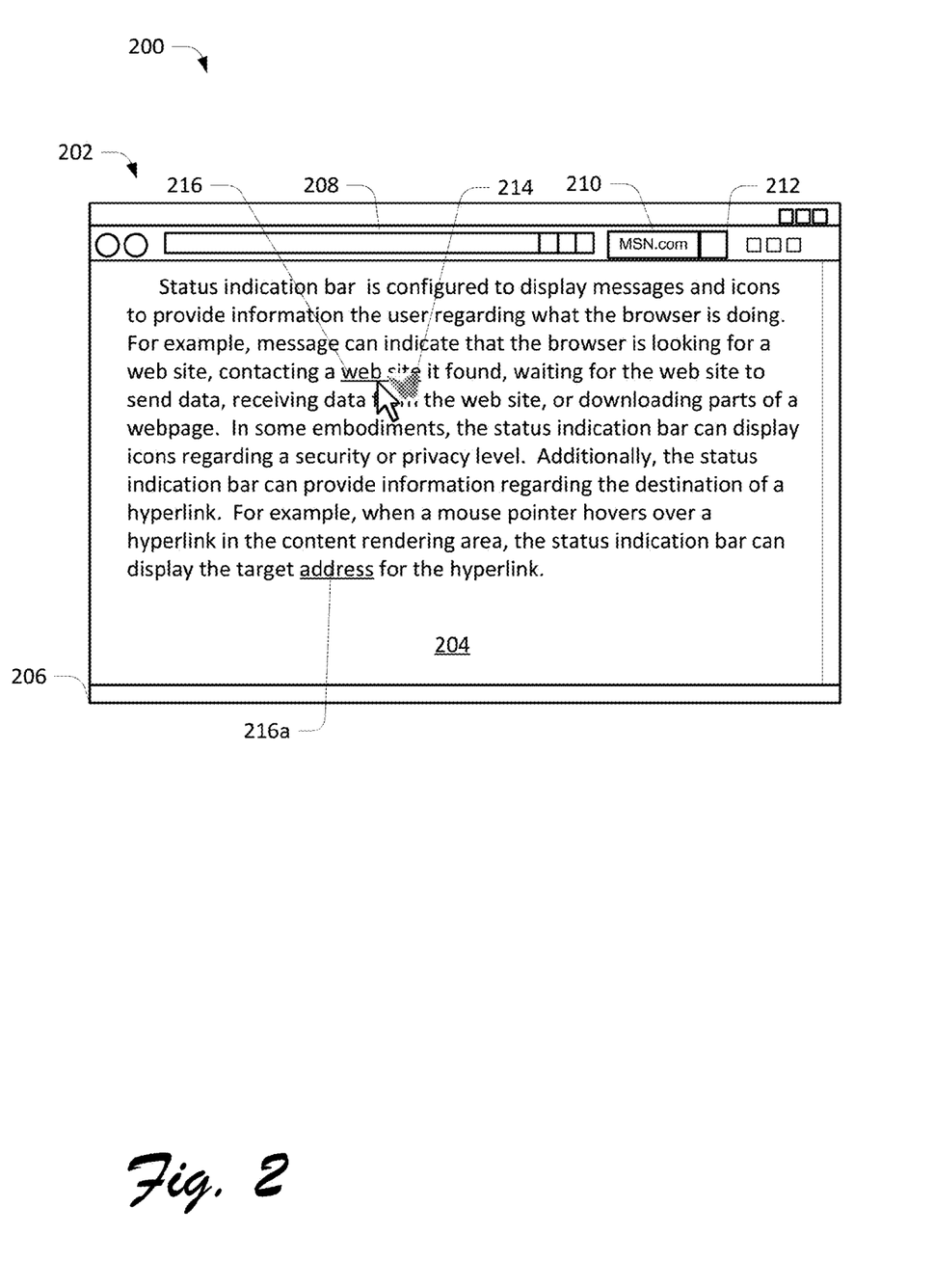
FIG. 2 illustrates an example web browser in accordance with one or more embodiments.

FIG. 2 illustrates an example web browser 200 in accordance with one or more embodiments. In this particular example, web browser 200 includes a web browser user interface 202 which includes a content rendering area 204 above a status indication bar 206. The web browser user interface 202 also includes an address bar 208, one or more tabs 210, and a new tab button 212 for opening additional tabs. Other controls can be provided depending on the specific embodiment.

Status indication bar 206 is configured to display messages and icons to provide information to the user regarding what the browser is doing. For example, a message can indicate that the browser is looking for a web site, contacting a web site it found, waiting for the web site to send data, receiving data from the web site, or downloading parts of a webpage, to name just a few. In some embodiments, the status indication bar 206 can display icons regarding a security or privacy level. Additionally, the status indication bar can provide information regarding the destination of a hyperlink. Specifically, when an input is received relative to a hyperlink that is of the type that is typically used to attempt to navigate to or initiate a navigation to an associated destination, the target destination can be displayed in the status indication bar. For example, when a mouse indicator 214 hovers over a hyperlink 216 in the content rendering area 204, the status indication bar 206 can display the target address for the hyperlink 216.

In various embodiments, the destination of the hyperlink 216 can be indicated by one or more changes or additions to the mouse indicator 214. In some embodiments, a rendering is provided adjacent to the mouse indicator to visually convey an affordance that is associated with the target destination. For example, in FIG. 2, when mouse indicator 214 hovers over the words "web site" which anchor hyperlink 216, a small butterfly logo is rendered adjacent to the mouse indicator to indicate that the target of the hyperlink 216 is a webpage hosted by MSN® (MSN and the MSN logo are registered trademarks of Microsoft Corporation). Other logos or icons can be employed, and can be added to mouse indicator 214 or can replace the mouse indicator 214. For example, a magnifying glass can be added to or can replace mouse indicator 214 when the target of a hyperlink is a search results page, or the mouse indicator 214 can be replaced with the MSN logo when the target of a hyperlink is a webpage hosted by MSN®.

Additionally or alternatively, the destination of the hyperlink 216 can be indicated by a change in the color of the hyperlink anchor. For example, the words "web site" which anchor hyperlink 216 can be displayed in light blue to indicate that the target of hyperlink 216 is a webpage hosted by MSN® while the word "address" which anchors hyperlink 216a can be displayed in orange to indicate that the target of hyperlink 216a is a webpage hosted by Bing® Maps (Bing is a registered trademark of Microsoft Corporation). The use of colors can be used to indicate the destination of the hyperlink in embodiments that do not include mouse indicators, such as in browsers on a mobile phone. The colors chosen to indicate destinations can vary, as will be appreciated by the skilled artisan. For example, a particular destination may have a prominent color with which it is associated or which is used to brand the destination. In this case, the prominent color may be used as a way to visually convey an association between the domain hosting the target destination of the hyperlink and the anchor displayed to a user.

In various embodiments, multiple hyperlinks associated with different target webpages (e.g., hyperlinks 216 and 216a in FIG. 2) can be identified. When multiple hyperlinks are identified, the system can utilize information associated with different respective target webpages to determine multiple respective styles to be applied to the webpage and visually apply different respective styles to indicate each target webpage.

In some embodiments, a visually applied style is selected based on information regarding a domain hosting the target webpage. For example, in FIG. 2, anchors leading to target webpages hosted on a domain such as MSN® can be displayed in light blue, while anchors leading to target webpages hosted on a domain such as Bing® can be displayed in orange. In such embodiments, the same style can be visually applied to multiple hyperlinks leading to different webpages hosted on the same domain.

Having described an example web browser employing hyperlink destination visibility, consider now various processes indicating a target destination of a hyperlink to a user without causing navigation of a browser to the target destination.

Figure 3:
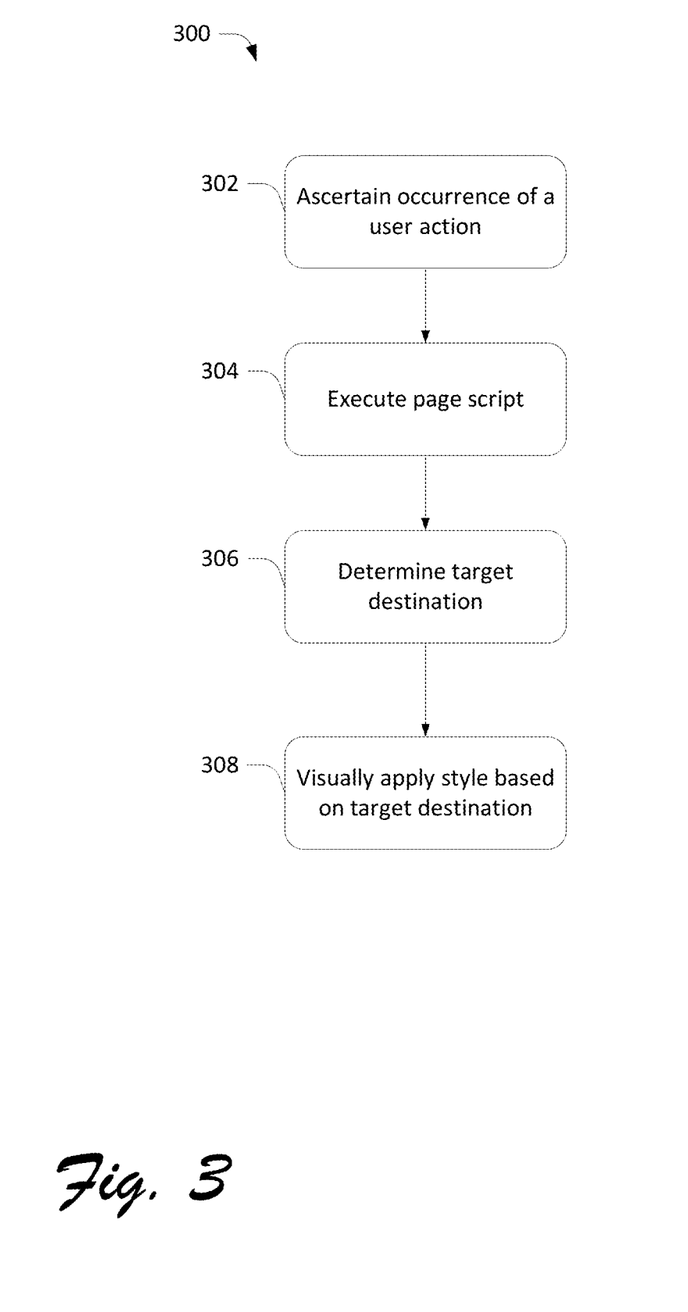
FIG. 3 is a is a flow diagram that describes steps in a method in accordance with one or more embodiments.

FIG. 3 is a flow diagram illustrating steps in a process 300 for indicating the destination of a hyperlink to a user. The process 300 can be implemented in connection with any suitable hardware, software, firmware, or combination thereof. In at least some embodiments, the method can be implemented by a client device, such as a personal computer or mobile phone, examples of which are provided above and below.

Block 302 ascertains occurrence of a user action. Any suitable type of user action can be ascertained. In the illustrated and described embodiments, user actions can include those that typically precede or initiate a navigation to a destination associated with a hyperlink. By way of example and not limitation, such actions can include a user hovering a mouse indicator over a hyperlink included on a webpage displayed by a browser. Block 304 executes at least a portion of a page script associated with a webpage. This can be performed in any suitable way. For example, in various embodiments, the hovering of a mouse over the hyperlink triggers the execution of one or more portions of JavaScript® code that encodes the webpage (JavaScript is a registered trademark of Oracle Corporation). The page script provides the browser with instructions regarding how to process the hyperlink.

Block 306 determines the target destination by processing the hyperlink. This can be performed in any suitable way. For example, various parsing techniques can be employed to extract the target destination from information associated with the hyperlink included in the page script. In various embodiments, additional processing by a web request handler can be employed to determine the target destination, such as when the hyperlink is a dynamic link with a variable target destination. Additional processing by the web request handler is described in more detail below.

Block 308 visually applies one or more styles based on the target destination. This can be performed in any suitable way. For example, in at least some embodiments, the page script can include a look up table (LUT) that defines one or more styles according to the target destination of a hyperlink. Alternately or additionally, the style can be inline coded within the page script. Styles defined according to target destination can include, by way of example and not limitation, text color, background color, mouse icon, mouse color, text styles (including bold, underline, or italics), and the like. Examples of how styles can be applied are provided above.

Figure 4:
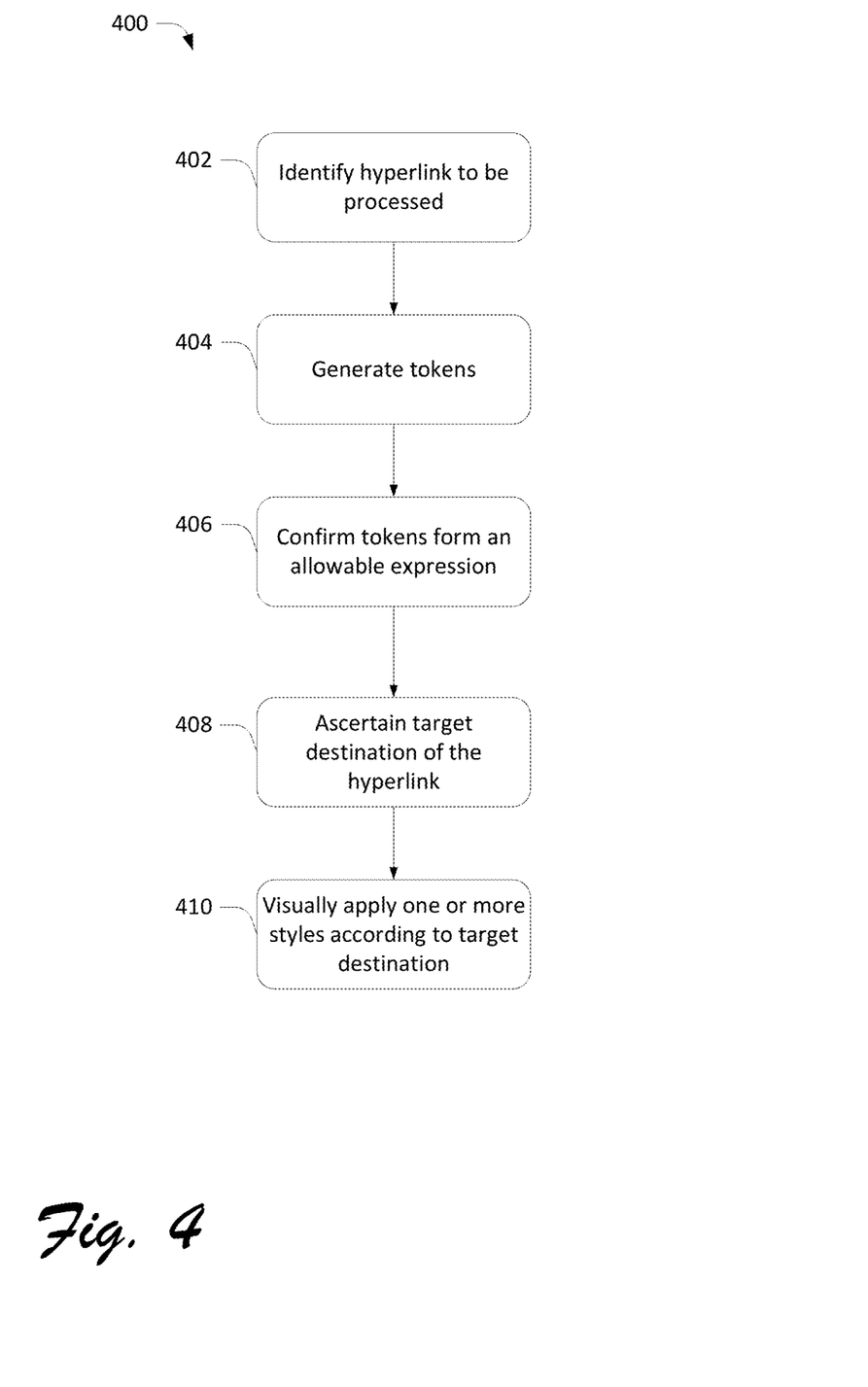
FIG. 4 is a flow diagram that describes steps in a method in accordance with one or more embodiments.

FIG. 4 is a flow diagram that describes steps in a process 400 of processing a hyperlink to determine a target destination in accordance with one or more embodiments. The method can be performed in connection with any suitable hardware, software, firmware, or combination thereof. In at least some embodiments, the method can be performed by a suitably-configured web browser, such as the one described above.

Block 402 identifies one or more hyperlinks to be processed. This can be performed in any suitable way. For example, in various embodiments, the hovering of a mouse over the hyperlink triggers the execution of one or more portions of page script that encodes the webpage and indicates that a hyperlink is present.

Next, block 404 generates tokens. This can be performed in any suitable way. For example, in one or more embodiments, a parser processes the page script and splits characters in the code into meaningful symbols according to known expressions. Each group of characters can include one or more characters, and is referred to as a token. For example, in the text "[Tour rookie] [Keegan Bradley], playing in his first [major championship], proved all of those statements wrong here [Sunday] when he won the [PGA Championship]," the brackets illustrate tokens, or words and phrases that have contextual meaning even when considered on their own.

Block 406 confirms that the tokens form an allowable expression. For example, the parser ensures that the tokens define components that make up an expression and that each word/phrase exists in a lookup table. For example, the parser can confirm that each token (e.g., Tour rookie, Keegan Bradley, major championship, Sunday, and PGA Championship from the example above) exists in a Wikipedia® entry lookup table (Wikipedia® is a registered trademark of Wikimedia Foundation, Inc.) or other database. If the parser has parsed the characters incorrectly, one or more of these tokens may not appear in the lookup table, and the parser can generate a new set of tokens.

Next, block 408 ascertains a target destination of the hyperlink. This can be done in any suitable way. For example, the parser selects the token including a URL destination of the hyperlink and ascertains the target destination of the hyperlink from the token. Usually, the target domain of the URL can be sufficient to indicate the target destination (e.g., the target network "msn.com" within the URL http://editorial.autos.msn.com/blogs/autosblog.aspx?feat=d363e301-a203-4080-a5d-39eb03946032).

Block 410 visually applies one or more styles based on the target destination without causing navigation of the browser to the target destination. This can be performed in any suitable way. For example, a look-up table (LUT) can define one or more styles according to the target destination of a hyperlink, or the style can be defined by the code in the page script. Styles defined according to target destination can include, by way of example and not limitation, text color, background color, mouse icon, mouse color, text styles (including bold, underline, or italics), and the like. For example, the LUT can define a style corresponding to the target network "msn.com", and the defined style can be applied to the hyperlinks with URLs including that target network (e.g., http://editorial.autos.msn.com/blogs/autosblog.aspx?feat=d363e301-a203-4080-a52d-39eb03946032). The browser then causes the webpage to be displayed accordingly.

Process 400 can employed in embodiments in which the target destination of the hyperlink can be determined by processing information associated with the webpage, and more particularly, by parsing the information associated with the hyperlinks included in the webpage. However, in some embodiments, such as embodiments where one or more hyperlinks are dynamic hyperlinks, additional processing can be used to determine the target destination.

Figure 5:
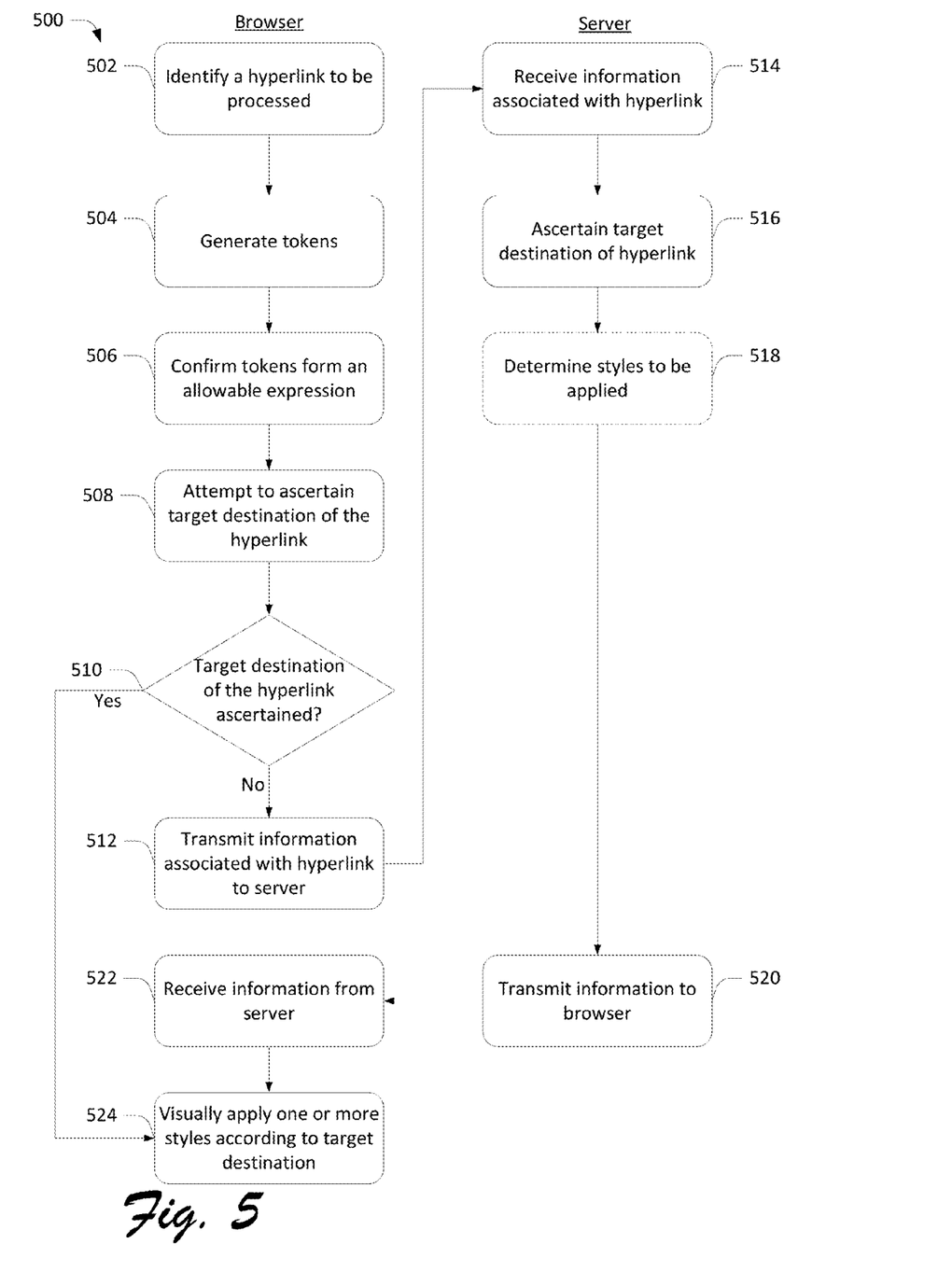
FIG. 5 is a flow diagram that describes steps in a method in accordance with one or more embodiments.

FIG. 5 is a flow diagram that describes steps in a method 500 of processing a hyperlink to determine the target destination in accordance with one or more embodiments. The method can be performed in connection with any suitable hardware, software, firmware, or combination thereof. In the illustrated example, some steps of the method are illustrated as being performed by a "Browser," while other steps of the method are illustrated as being performed by a "Server." In at least some embodiments, the method can be performed by a suitably-configured web browser, such as the one described above.

Block 502 identifies a hyperlink to be processed. This can be performed in any suitable way. For example, in various embodiments, the hovering of a mouse over the hyperlink triggers the execution of one or more portions of a page script that encodes the webpage and indicates that a hyperlink is present.

Next, block 504 generates tokens. This can be done in any suitable way. For example, a parser processes the page script and splits the characters in the code into meaningful symbols according to known expressions. Each group of characters can include one or more characters, and is referred to as a token. Example tokens are "Seattle," "Forrest Gump," "Bill Clinton" or "Committee to Investigate the Condition of the Potomac River Front at Washington."

Block 506 confirms that the tokens generated at block 504 form an allowable expression. This can be performed in any suitable way. For example, the parser can ensure that the tokens define components that make up an expression and that each word/phrase in the expression exists in a Wikipedia® entry lookup table.

Next, block 508 attempts to ascertain a target destination of the hyperlink. This can be performed in any suitable way, examples of which are provided above. Block 510 determines whether a target destination of the hyperlink was ascertained at block 508. If the target destination of the hyperlink was ascertained, block 524 visually applies one or more styles according to the target destination. However, if block 510 determines that no target destination was ascertained, the process proceeds to block 512. Attempts to ascertain a target destination of the hyperlink can fail (e.g., a "no" at block 510), for example, when the parser is unable to determine the target destination of the hyperlink based on the tokens. For example, the parser determines that the token including the URL destination of the hyperlink is missing or is indicative of a variable destination.

Block 512 transmits information associated with the hyperlink to the server. The server can be, for example, the web site host server on which the webpage resides. Information transmitted to the server can include information determined by the parser as well as additional information about the user or environment for use in determining the destination of the hyperlink. For example, the target destination of the hyperlink can vary depending on the date, time, user location, or other factors. In addition to transmitting information associated with the hyperlink and user information, the browser can transmit a cookie corresponding to the webpage to the server.

Block 514 receives the information associated with the hyperlink. Block 516 ascertains a target destination of the hyperlink. This can be performed in any suitable way. For example, a web request handler can determine the target destination of the hyperlink based on the information received from the browser.

In some embodiments, the process continues to optional block 518. Block 518 determines styles to be applied. This can be performed in any suitable way. For example, the web request handler can determine styles to be applied based on the target destination of the hyperlink utilizing a LUT to determine one or more styles to be altered according to the target destination. Styles defined according to target destination can include, by way of example and not limitation, text color, background color, mouse icon, mouse color, text styles (including bold, underline, or italics), and the like. Then, block 520 transmits information to the browser. In embodiments including block 518, the server can transmit the style information, the target destination, and other information to the browser. Block 522 receives the information from the server, and block 524 visually applies one or more styles according to the target destination of the hyperlink without causing navigation to the target destination.

In alternate embodiments, computational demands on the server can be reduced by shifting the style determination to the browser. In such embodiments, after block 516 ascertains the target destination of the hyperlink, the process continues to block 520. Block 520 transmits information to the browser. This can be performed in any suitable way. For example, the server can transmit the target destination of the hyperlink along with other information to the browser to enable the browser to determine one or more styles according to the target destination. For example, other information transmitted can include information regarding a domain hosting the target webpage. Block 522 receives the information from the server, and block 524 visually applies one or more styles according to the target destination. This can be performed in any suitable way. For example, the browser can utilize a LUT or one or more style sheets embedded in the page script to determine one or more styles to be altered depending on the target destination. Styles defined according to target destination can include, by way of example and not limitation, text color, background color, mouse icon, mouse color, text styles (including bold, underline, or italics), and the like.

Having described an example method of processing to determine the destination of a hyperlink and indicate the destination to a user, consider now a discussion of an example system that can be used to implement one or more embodiments.

Example System

Figure 6:
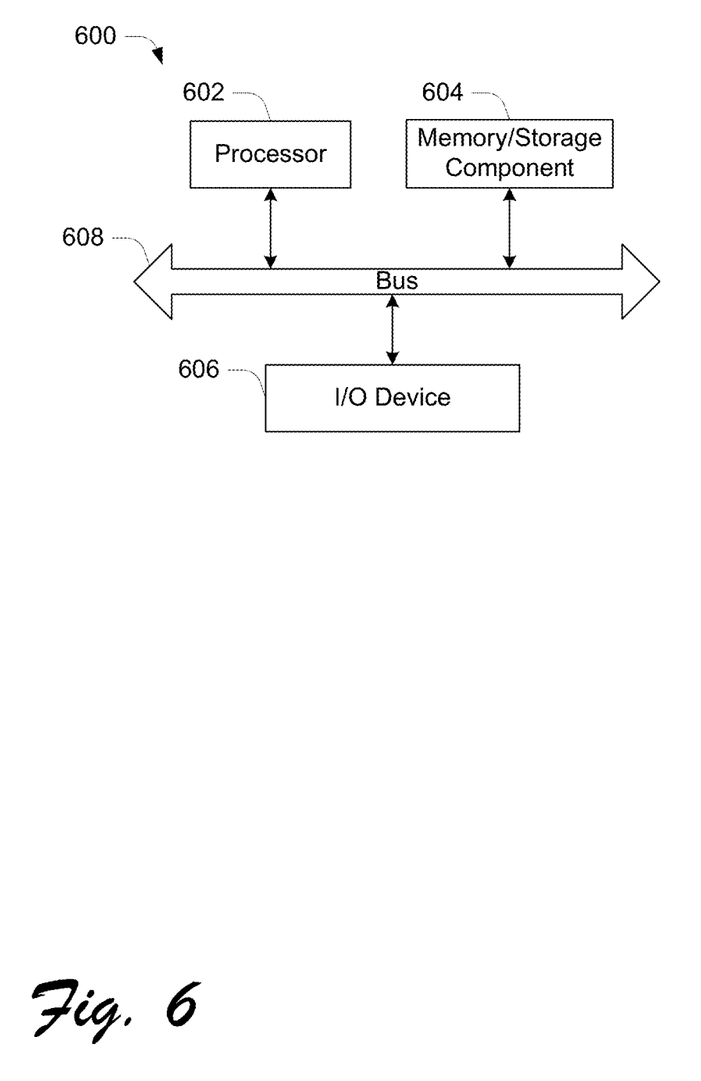
FIG. 6 illustrates an example system that can be utilized to implement one or more embodiments.

FIG. 6 illustrates an example computing device 600 that can be used to implement the various embodiments described above. Computing device 600 can be, for example, client computing device 102 of FIG. 1, or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Memory/storage component 604 can include volatile media (such as random access memory (RAM)) and/or nonvolatile media (such as read only memory (ROM), flash memory, optical disks, magnetic disks, and so forth). Component 604 can include fixed media (e.g., RAM, ROM, a fixed hard drive, etc.) as well as removable media (e.g., a flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While various embodiments have been described above, it should be understood that they have been presented by way of example, and not limitation. It will be apparent to persons skilled in the relevant art(s) that various changes in form and detail can be made therein without departing from the scope of the present disclosure. Thus, embodiments should not be limited by any of the above-described exemplary embodiments, but should be defined only in accordance with the following claims and their equivalents.

What is claimed is:

1. A device comprising:
one or more processors;
one or more computer-readable storage memories embodying computer-readable instructions which, when executed by the one or more processors, implement a method comprising:
   transmitting, to a client device, a webpage that includes at least one hyperlink;
   receiving, from the client device, a request for information associated with a target webpage to which the at least one hyperlink leads;
   ascertaining the-information regarding the target webpage to which the at least one hyperlink leads, the information comprising information regarding a domain hosting the target webpage; and
   transmitting, to the client device, the information regarding the target webpage to which the at least one hyperlink leads, the information being configured to enable determining of at least one style, from multiple styles, to be applied to the webpage and applying of the at least one style to the webpage, the determining of the at least one style being based at least upon the information regarding the domain hosting the target webpage.

2. The device of claim 1, the at least one style comprising a color of an anchor within the target webpage from which the at least one hyperlink can be followed, a mouse indicator, or a background color.

3. The device of claim 1, said determining comprising utilizing a look up table.

4. The device of claim 1, said determining comprising extracting style information from a page script corresponding to the webpage.

5. The device of claim 1, further comprising ascertaining the target webpage by extracting information regarding the target webpage from a page script corresponding to the webpage.

6. The device of claim 1, at least one hyperlink comprising a dynamic hyperlink.

7. The device of claim 1, the determining further based at least in part upon information associated with the target webpage.

8. A method, executed by one or more computer processors, comprising:
   transmitting, to a client device, a webpage that includes at least one hyperlink;
   receiving, from the client device, a request for information associated with a target webpage to which the at least one hyperlink leads;
   ascertaining said information regarding the target webpage to which the at least one hyperlink leads, the information comprising information regarding a domain hosting the target webpage; and
   transmitting, to the client device, the information regarding the target webpage to which the at least one hyperlink leads, the information being configured to enable determining of at least one style, from multiple styles, to be applied to the webpage and applying of the at least one style to the webpage, the determining of the at least one style being based at least upon the information regarding the domain hosting the target webpage.

9. The method of claim 8, the at least one style comprising a color of an anchor within the target webpage from which the at least one hyperlink can be followed, a mouse indicator, or a background color.

10. The method of claim 8, said determining comprising utilizing a look up table.

11. The method of claim 8, said determining comprising extracting style information from a page script corresponding to the webpage.

12. The method of claim 8, further comprising ascertaining the target webpage by extracting information regarding the target webpage from a page script corresponding to the webpage.

13. The method of claim 8, at least one hyperlink comprising a dynamic hyperlink.

14. The method of claim 8, the determining further based at least in part upon information associated with the target webpage.

15. A method, executed by one or more computer processors, comprising:
   ascertaining information regarding a target webpage of a first hyperlink displayed in a webpage, the information regarding the target webpage of the first hyperlink comprising information regarding a first domain, the first domain hosting the target webpage of the first hyperlink;
   ascertaining information regarding a target webpage of a second hyperlink displayed in the webpage, the information regarding the target webpage of the second hyperlink comprising information regarding a second domain hosting the target webpage of the second hyperlink;
   determining a first style to be associated with the first hyperlink in the webpage based at least in part upon the information regarding the target webpage of the first hyperlink;
   determining a second style to be associated with the second hyperlink in the webpage based at least in part upon the information regarding the target webpage of the second hyperlink, the first style and the second style being different from one another; and
   transmitting information regarding the first style and the second style to a client device.

16. The method of claim 15, at least one of the first style and the second style comprising a color of an anchor within a webpage from which an associated hyperlink can be followed or a background color.

17. The method of claim 15, said determining comprising determining at least one of the first style and the second style to be applied utilizing a look up table.

18. The method of claim 15, said determining comprising extracting style information from a page script corresponding to the webpage.

19. The method of claim 15, the ascertaining further comprising extracting information regarding the target webpages from a page script corresponding to the webpage.

20. The method of claim 15, at least one of the first hyperlink and the second hyperlink comprising a dynamic hyperlink.

* * * * *